Nov. 22, 1960

U. G. CANNATA 2,960,776

MEANS FOR FORMING A PROFILE TEMPLATE OR THE LIKE

Filed July 28, 1958

INVENTOR.
UMBERTO G. CANNATA

BY
*Duane C. Bowen*

United States Patent Office 2,960,776
Patented Nov. 22, 1960

2,960,776
MEANS FOR FORMING A PROFILE TEMPLATE OR THE LIKE

Umberto G. Cannata, Wichita, Kans., assignor to Boeing Airplane Company, Wichita, Kans., a corporation of Delaware Filed July 28, 1958, Ser. No. 751,293

5 Claims. (Cl. 33—174)

My invention relates to means for forming a profile template. The instruments disclosed herein are used in the forming of an accurate profile after the template has a profile roughly formed on one longitudinal axis and has y-axis scribed lines thereon defining profile break points. I provide a pair of locator bars adapted to support the template plate with the y-axis scribed lines aligned with a micrometer adapted to measure distances along the scribed line. After the assembly is properly oriented, a guide bar is abutted to the spindles of the micrometer whereby the accurate profile line on the template is indicated by the guide bar.

Guidance of the cutter path on various machines is controlled by profile templates that may control the cutter height (z-axis) and cutter movement longitudinally (x-axis) and transversely (y-axis) of the work. Rollers on the machine follow the contours of the profile and one factor in the accuracy of the work machined is the tolerances of the profile of the template plate. My invention relates to improved means for forming the profile in achieving greater accuracy and saving time in the profile finishing process.

The prior method of profile finishing included locating a guide bar for shaving the profile by means of height gauges and dial indicators. Setup was a trial and error process requiring repeated efforts to attain a single plane dimension within the tool design tolerances. When the present invention was substituted for the prior procedure, two man hours were saved per lineal foot of templates cut and accuracy was improved.

The objectives of my invention include, therefore, to devise an improved means for forming and finishing the profile of a profile template; to improve the accuracy of the profile in a profile template; and to reduce the labor required in forming and finishing profile templates.

My invention will be best understood, together with additional objectives and advantages thereof, from the following description, read with reference to the drawings, in which.

Figure 1:
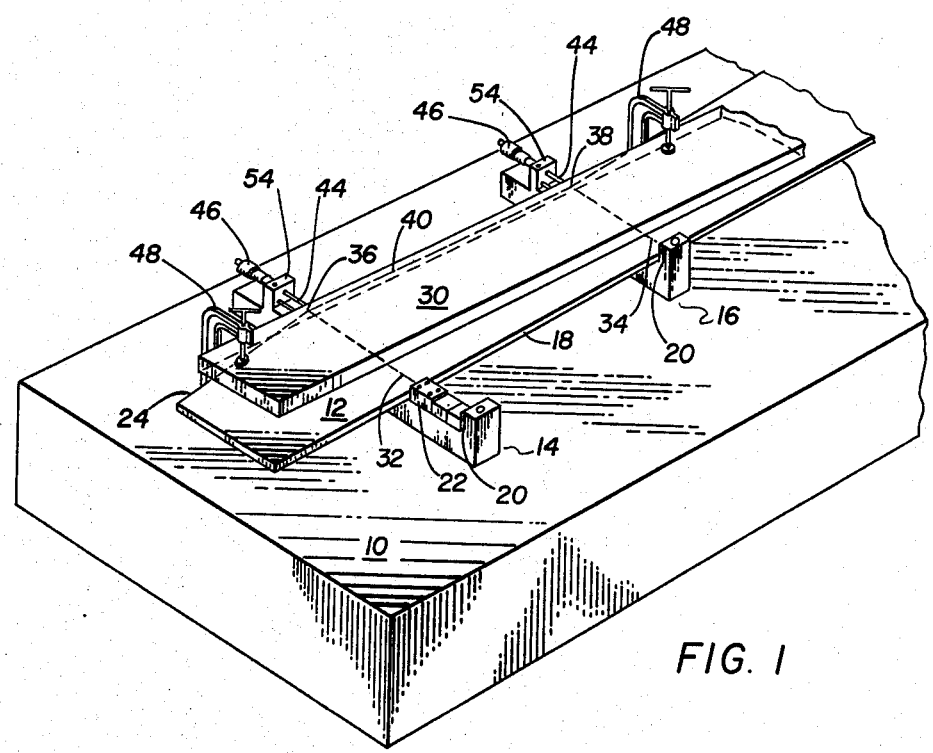
Figure 1 is a perspective view of an assembly incorporating a specific embodiment of the invention including a supporting table, a pair of locator bars, a template plate, and a guide bar secured thereto.
Figure 2:
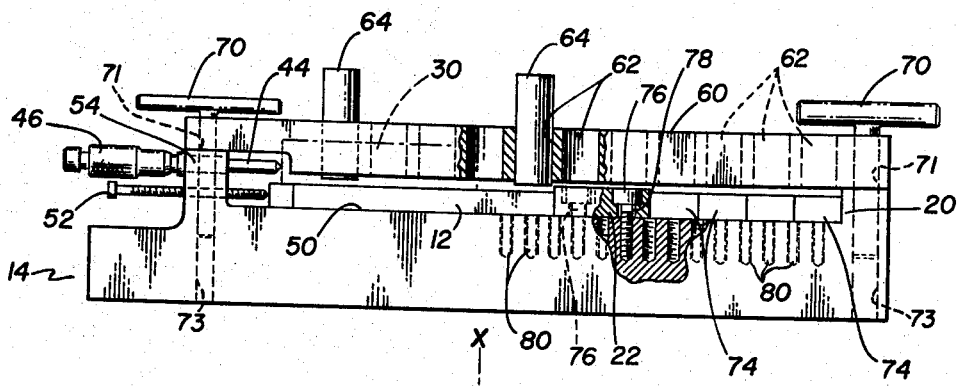
Figure 2, is an enlarged side elevation, with portions cut away and shown in section, including a template plate supported on the locator bar, and indicating in dotted lines the position a guide bar will assume on the template plate.
Figure 3:
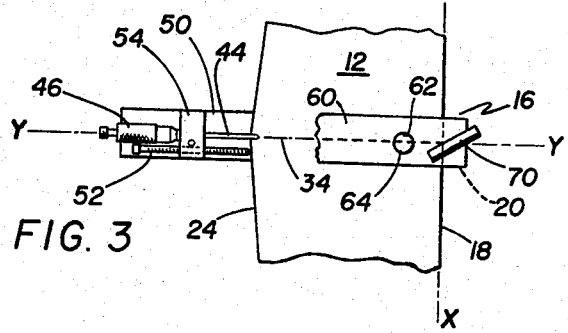
Figure 3 is a plan view, with portions broken away, of a locator bar and a template plate supported thereon.

The locator bar 14 shown in Figure 2 and at the left in Figure 1 is one form of locator bar, and the locator bar 16 shown in Figure 3 and at the right in Figure 1 is a simplified form of the invention. As will be described in more detail later, the locator bars are essentially the same except that the Figure 2 construction is adapted to accept a greater range of widths of template plates. Like parts on the two forms of templates are given the same numeral references.

The supporting surface 10 may be a precision work table or a tooling bar. The template plate 12 is supported by a pair of locator bars 14, 16. The back edge 18 of template 12 is in abutment with an end abutment 20 on locator bar 16 and with a movable abutment 22 spaced from end abutment 20 on locator bar 14. The profile edge 24 of template plate 12 has been rough sawed with about 1/32 inch excess material.

The objective of the setup in Figure 1 is to set a guide bar 30 in a correct location relative a pair of y-axis scribed lines 32, 34 on template plate 12. The y-axis scribed lines 32, 34 intersect break points 36, 38 on profile edge 24, the portion 40 of profile edge 24 between the break points being a straight line. Line 40 may be described as extending a given distance in the x-axis longitudinal direction of the template plate, parallel to back edge 18, and between two given y-axis distances from back edge 18 terminating at break points 36, 38. The y-axis scribed lines 32, 34 are spaced the given x-axis distance apart and the y dimensions are measured therealong. The y distances are indicated by the distance between abutments 20 and 22 and the end of micrometer spindles 44 supported at the other end of the locator bar from the before described abutments.

After the dimensions are set, guide bar 30 is abutted to spindles 44 of micrometers 46. Then guide bar 30 is clamped to template 12 by C-clamps 48 and the template plate is removed from the locator bars so that profile portion 40 can be milled along the line established by guide bar 30 with suitable equipment such as a rivet shaver. The process is repeated for each profile portion between profile break points.

Locator bars 14 and 16 have elongated rest portions 50 for support of template plate 12. After template plate 12 is properly oriented thereon, the plate is clamped in place against abutment 22 or 20 by threaded pusher pins 52 set in threaded openings in an upstanding support portion 54 on bars 14, 16. Back edge 18 of template plate 12 will hence be abutted to the locator bar abutments.

The orientation of the y-axis scribed lines, such as 32 and 34 in Figure 1 and 68 in Figure 3, is accomplished by the use of an overlay template 60 shown in Figures 2 and 3. The overlay template differs in the two views as the Figure 3 construction only has two openings 62 (one shown and the other having a like position at the other end of template 60) for the support of optical viewing devices 64 whereas the Figure 2 construction has a series of openings 62. Devices 64 may be frictionally secured in selected openings 62. The objective is to have the y-axis line aligned with the path of travel of the micrometer spindle 44 toward the abutments. This is accomplished by superposing overlay template 60 to locator bars 14, 16 after template plate 12 is supported thereon. Overlay template 60 is secured in proper position by a pair of dowel pins 70 having handles and closely fitting matching openings 71 and 73 in the overlay template and locator bar respectively. The optical viewing devices 64 may be one of a number of types having a cross hair viewable down the axis thereof. A suitable device in use at Boeing Airplane Company, Wichita, Kansas, is called an opticenter or optical centering device and comprises a transparent plastic cylinder encased in a tubular metal sleeve and having crossed scribed lines centered at one end whereby an optical cross hair effect is created for alignment sighting. The cross hairs of the optical viewing devices are aligned with the axis of micrometer spindle 44. When the y-axis scribed line, such as 34, is viewed through the optical viewing devices 64 and aligned with the cross hair therein, the scribed line will be aligned beneath the path of travel of the micrometer spindle 44 toward the abutments. The purpose of having several openings 62 in the Figure 2 construction is to locate viewing devices 64 as near to the ends of the scribed line as possible, the length of the line varying according to the width of the template plate and the location of the movable abutment.

After the locator bar is properly oriented relative to the scribed line by this process, then pusher pin 52 is tightened against the template plate and the overlay template 60 may be removed. The line on which micrometer spindle 44 works is spaced above the upper surface of the template plate so that the spindle will clear all thicknesses of template plates.

During manufacture, locator bars 14, 16 are constructed so that the end of spindles 44 of micrometers 46 are a given distance from the end abutment 20 when the micrometer is at zero setting. At zero setting, usually this dimension is some full inch distance, i.e., 8.00 or 9.00 inches. The micrometer spindle usually has an inch travel which means that from a given abutment, distances from abutment 20 may be set within an inch difference, i.e., 7.53 or 8.27. For example, in Figure 3 the distance from end abutment 20 to the end of spindle 44 when the micrometer is set at zero might be 10 inches. If the y-axis dimension to be measured on scribed line 68 is 9½ inches, the micrometer would be set for .50. When guide bar 30 is abutted to the end of the spindle, the break point, as 36 or 38, is accurately located. When the edge 24 is milled along guide bar 30, the profile is accurately formed within acceptable tolerances.

The locator bar 14 shown in Figure 2 is adapted to accept a range of widths of template plates 12. The movable abutment 22 has a known width and the distance from abutment 20 to the end of micrometer spindle 44 at zero setting of the micrometer is known. When a template of a width less than the maximum capacity of locator bar 14 is to be processed, abutment 22 is positioned so that the dimension between its face and the micrometer spindle is within the range of micrometer operation. Movable abutment 22 is oriented in such position by the use of a plurality of gauge blocks 74. Abutment 22 is pressed and blocks 74 are moved against abutment 20 and then abutment 22 is secured in position by means of bolts 76 extending through slotted holes 78 in abutment 22 and threaded in adjacent tapped holes 80. Overlay plate 60 has a series of openings 62 whereby an optical sighting device 64 may be positioned adjacent abutment 22 regardless of the width of the template plate.

The operation of forming a profile template will be described. The steps of the procedure prior to the use of the locator bars follows prior practice and, these steps being well known to the art, the prior procedure will be only briefly surveyed. A guide bar is clamped to a blank template plate and the back edge and both ends are shaved flush with the bar. The edges are checked on a surface table for straightness. The plate is supported on a layout table and the x-axis dimensions longitudinally of the plate are laid out according to the design. Then the y-axis scribed lines are formed with a square. Next the profiled edge is rough sawed with about 1/32 inch excess. The back edge may have to be reshaved if warped after the profile saw cut.

At this point, the system of the present invention is substituted for prior apparatus. The plate is supported by locator bars in the manner shown in Figure 1. The y-axis scribed lines are oriented to the locator bars by means of the overlay templates 60 and the sighting devices 64 are used to determine that the y-axis scribed line is aligned with the axis of the micrometer spindle 44. The plate is then clamped in position through the use of pusher pins 52 and the overlay templates are removed. When the y-axis dimensions have been set by means of the micrometers 46, guide bar 30 is abutted to the micrometer spindles 44 and then guide bar 30 is clamped to template plate 12. At this point the template and guide bar are moved to shaving equipment for finishing the profile edge portion 40 by the use of a shaver using bar 30 as a guide. The last part of the procedure is repeated until all sections of profile edge 24 are finished.

For convenience of description, directions transversely of the template plate have been referred to as y-axis dimensions, i.e., see the x—x and y—y axes lines in Figure 3. The y-axis commonly represents dimensions transversely of the work. The z-axis commonly represents cutter height. The x-axis commonly represents dimensions longitudinally of the work. The scribed axis lines extending transversely of the template plate may instead be z-axis lines or, in certain machines, may represent dimensions longitudinally of the work.

As will be observed from the above description, the present invention permits profile finishing to be accomplished with close tolerances and a minimum expenditure of time.

Having thus specifically described my invention, I do not wish to be understood as limiting myself to the precise details of construction shown, but instead wish to cover those modifications thereof that will occur to those skilled in the art from my disclosure and that fairly fall within the scope of my invention, as described in the following claims.

I claim:

1. Means for forming a template plate having a profile roughly shaped on one longitudinal edge and having y-axis scribed axis lines extending transversely thereof for defining profile break points, comprising a flat supporting surface and a pair of locator bars thereon having elongated rest portions supporting said template plate at the locations of an adjacent pair of said scribed lines, each bar having a fixed abutment at one end of said rest portion and having a movable abutment disposed on said rest portion and means for securing said movable abutment at various distances from said fixed abutment at distances measured by interposing gauge blocks or the like therebetween and each bar having a support portion at the other end of said rest portion supporting a micrometer having a spindle working toward said fixed abutment on a line above the upper surface of said template plate and disposed adjacent the profiled longitudinal edge whereby distances along said scribed lines may be measured, said locator bars each having an overlay template supported by said locator bar and having a series of openings therealong and two selected openings supporting a pair of optical devices aligned with said line on which said micrometer spindle works for viewing the scribed line to determine its alignment with said line on which said micrometer spindle works, and a guide bar abutted to the spindles of said micrometers and adapted to be clamped to said template plate whereby a profile line between break points on said template may be indicated thereon by said guide bar and the guide bar may be used as a guide in milling said template plate along said profile line.

2. Means for forming a template plate having a profile roughly shaped on one longitudinal edge and having scribed axis lines extending transversely thereof for defining profile break points, comprising: a flat supporting surface and a pair of locator bars thereon having elongated rest portions supporting said template plate at the locations of an adjacent pair of said scribed lines, each bar having an abutment at one end of said rest portion against which the other longitudinal edge of said template plate may be abutted and having a support portion at the other end of said rest portion supporting a micrometer having a spindle working toward said abutment on a line above the upper surface of said template plate and disposed adjacent the profiled longitudinal edge whereby distances along said scribed lines may be measured, said locator bars each having an overlay template supported by said locator bar and supporting a pair of optical devices aligned with said line on which said micrometer spindle works for viewing the scribed line to determine its alignment with said line on which said micrometer spindle works, and a guide bar abutted to the spindles of said micrometers and adapted to be clamped to said template plate whereby a profile line between break points on said template may be indicated thereon by said guide bar and the guide bar may be used as a guide in milling said template plate along said profile line.

3. The subject matter of claim 2 in which each locator bar has a movable abutment for said template plate disposed on said rest portion between the first mentioned abutment and said micrometer, means operative to secure said movable abutment at various positions along said rest portion, and means on each locator bar operative to clamp said template plate against said abutments.

4. Means for forming a template plate having a profile roughly shaped on one longitudinal edge and having scribed axis lines extending transversely thereof for defining profile break points, comprising: a supporting surface and a pair of locator bars thereon having rests supporting said template plate at the locations of an adjacent pair of said scribed lines, each bar having an abutment at one end of said rest against which the other longitudinal edge of said template plate may be abutted and having support means at the other end of said rest supporting a micrometer having a spindle toward said abutment working on a line above the upper surface of said template plate and disposed adjacent the profiled longitudinal edge whereby distances along said scribed lines may be measured, and a guide bar abutted to the spindles of said micrometers and adapted to be clamped to said template plate whereby a profile line between break points on said template may be indicated thereon by said guide bar and the guide bar may be used as a guide in milling said template plate along said profile line.

5. A device for orienting a guide trimming bar to a scribed axis line extending transversely of a profile template and other like uses, comprising: a locator bar having a fixed abutment near one end and having a micrometer supported near the other end having a spindle directed toward said fixed abutment, a movable abutment and securing means operative to secure said movable abutment at various locations between said micrometer and said fixed abutment, said locator bar having a rest to receive the profile template between said movable abutment and said micrometer, said micrometer spindle being spaced above said rest whereby the spindle may work above the upper surface of such profile template, an overlay template supported on said locator bar above said rest and having a series of openings therealong and two selected openings supporting a pair of sighting devices spaced apart along and aligned with the line between said micrometer spindle and said fixed abutment whereby said sighting devices can be operated to indicate alignment of such scribed axis line with said line between said spindle and said fixed abutment and distances along the scribed axis line can then be measured by said micrometer and whereby such guide trimming bar then can be abutted to said spindle to form a guide for template trimming.

References Cited in the file of this patent
UNITED STATES PATENTS

| | | |
|---|---|---|
| 1,358,321 | Lovell | Nov. 9, 1920 |
| 1,463,440 | Pichler | July 31, 1923 |
| 2,238,887 | King | Apr. 22, 1941 |
| 2,688,803 | Huck | Sept. 14, 1954 |
| 2,724,186 | Lenart | Nov. 22, 1955 |
| 2,748,489 | Meilstrup | June 5, 1956 |

FOREIGN PATENTS

| | | |
|---|---|---|
| 138,902 | Sweden | Jan. 27, 1953 |